United States Patent
Willams et al.

(10) Patent No.: US 8,267,489 B2
(45) Date of Patent: Sep. 18, 2012

(54) INDUSTRIAL MACHINE ASSEMBLY

(75) Inventors: Thomas David Willams, Hudson, OH
(US); Bruce John Chantry, Solon, OH
(US)

(73) Assignee: Lincoln Global, Inc., Cleveland, OH (US)

( * ) Notice: Subject to any disclaimer, the term of this patent is extended or adjusted under 35 U.S.C. 154(b) by 428 days.

(21) Appl. No.: 12/703,437

(22) Filed: Feb. 10, 2010

(65) Prior Publication Data
US 2011/0192823 A1    Aug. 11, 2011

(51) Int. Cl.
*A47B 95/02*    (2006.01)
(52) U.S. Cl. ............. 312/244; 219/121.39; 219/121.45; 219/136
(58) Field of Classification Search ............. 219/121.39, 219/121.44, 136; 312/244
See application file for complete search history.

(56) References Cited

U.S. PATENT DOCUMENTS

| | | | | |
|---|---|---|---|---|
| 3,413,050 | A * | 11/1968 | Sommers et al. | 312/107 |
| 4,202,509 | A * | 5/1980 | Horn | 242/593 |
| 4,266,835 | A * | 5/1981 | Schmidt | 312/244 |
| 4,966,258 | A * | 10/1990 | Hawley | 190/4 |
| 5,028,099 | A * | 7/1991 | Bertucco | 312/249.12 |
| 5,110,193 | A * | 5/1992 | McClenning | 312/282 |
| 5,232,796 | A | 8/1993 | Baumgartner | |
| 5,725,422 | A | 3/1998 | Leweck | |
| 5,845,978 | A * | 12/1998 | Jung | 312/244 |
| 6,220,680 | B1 * | 4/2001 | Chen | 312/223.2 |
| 6,484,364 | B2 * | 11/2002 | Turner | 16/443 |
| 6,802,108 | B2 * | 10/2004 | Haselby et al. | 16/422 |
| 6,810,547 | B2 | 11/2004 | Hung | |
| 7,398,664 | B1 | 7/2008 | Weinerman et al. | |
| 2004/0169115 | A1 | 9/2004 | Glenn et al. | |
| 2005/0000946 | A1 * | 1/2005 | Albrecht et al. | 219/74 |
| 2005/0229766 | A1 | 10/2005 | Lee | |
| 2008/0011729 | A1 * | 1/2008 | Brietbach | 219/136 |
| 2009/0115297 | A1 * | 5/2009 | Bulow et al. | 312/244 |
| 2009/0124396 | A1 | 5/2009 | Vetter et al. | |

OTHER PUBLICATIONS www.millerwelds.com/pdf/spec_sheets/AD1-5.pdf, retrieved on Nov. 17, 2009.
www.millerwelds.com/resources/articles/images/simi_valley/IMG_8633.jpg; retrieved Nov. 17, 2009.

* cited by examiner

*Primary Examiner* — Anh Mai
(74) *Attorney, Agent, or Firm* — Ulmer & Berne LLP (57) ABSTRACT

An industrial machine assembly includes an industrial machine and a handle. The industrial machine includes an upper wall and a side wall. The side wall and upper wall cooperate to define a corner. The handle includes a grasping portion, a first flange, and a second flange. The handle is configured for attachment to the industrial machine in one of a first position and a second position. When the handle is in the first position, the first and second flanges straddle the corner such that the first flange is adjacent to the upper wall and the second flange is adjacent to the side wall. When the handle is in the second position, the first and second flanges straddle the corner such that the first flange is adjacent to the side wall and the second flange is adjacent to the upper wall.

18 Claims, 6 Drawing Sheets

INDUSTRIAL MACHINE ASSEMBLY

TECHNICAL FIELD

An industrial machine assembly includes an industrial machine and at least one handle releasably attached to the industrial machine.

BACKGROUND

Certain conventional industrial machines can include handles that permit a user to lift and/or move the industrial machine.

SUMMARY

In accordance with one embodiment, an industrial machine assembly comprises an industrial machine and a handle. The industrial machine comprises a frame, an upper wall, and a side wall. The side wall and upper wall are coupled with the frame. The side wall and upper wall cooperate to define a corner. The handle comprises a grasping portion, a first flange, and a second flange. The handle is releasably attached to the industrial machine and is configured for attachment to the industrial machine in one of a first position and a second position. When the handle is in the first position, the first and second flanges straddle the corner such that the first flange is adjacent to the upper wall and the second flange is adjacent to the side wall. When the handle is in the second position, the first and second flanges straddle the corner such that the first flange is adjacent to the side wall and the second flange is adjacent to the upper wall.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Figure 1:
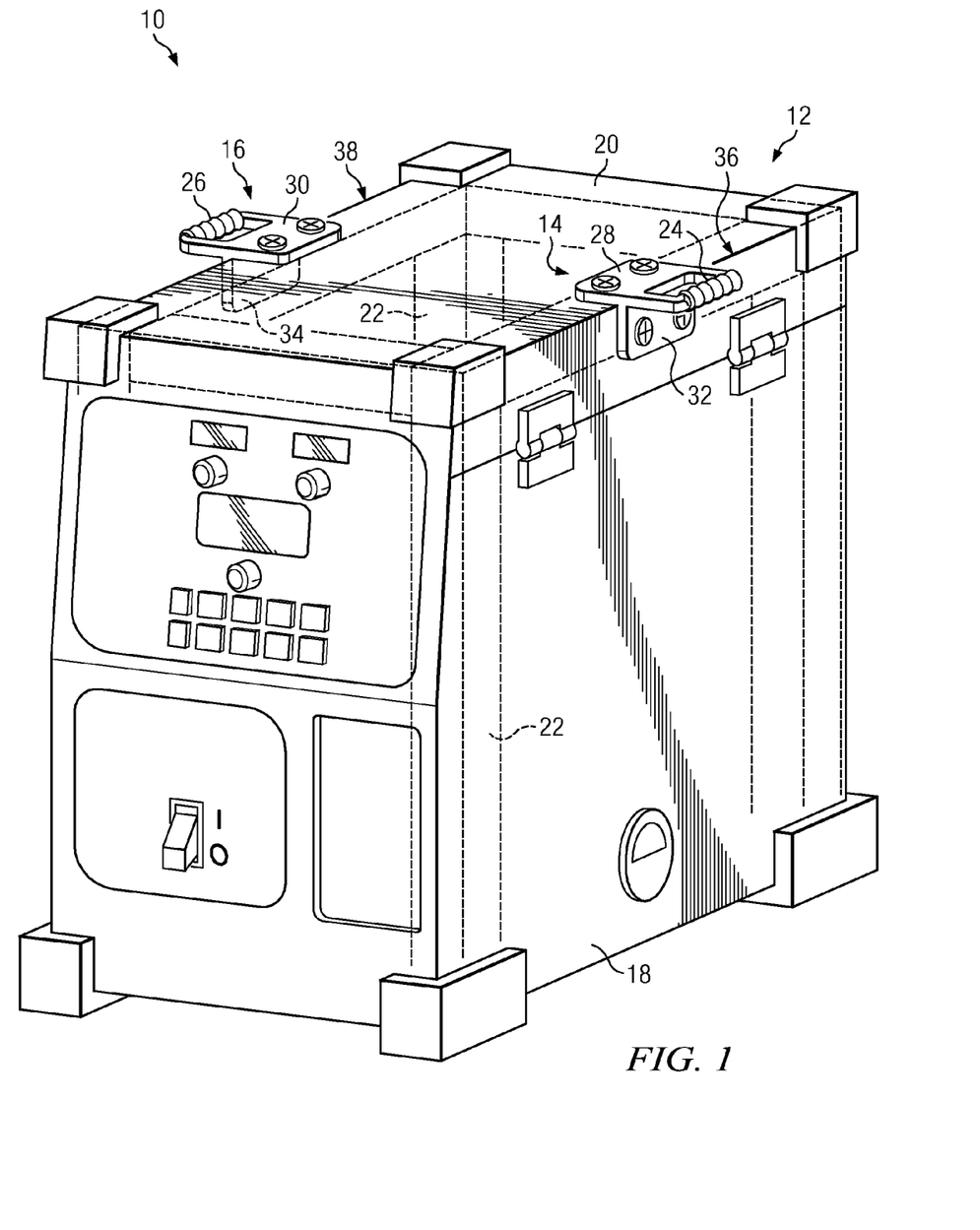
FIG. 1 is a front perspective view depicting an industrial machine assembly including left and right handles, wherein the left and right handles are each shown in a first position.

Embodiments are hereinafter described in detail in connection with the views of FIGS. 1-8, wherein like numbers indicate the same or corresponding elements throughout the views. As illustrated in FIG. 1, an industrial machine assembly 10 can include an industrial machine 12, a left handle 14, and a right handle 16. In one embodiment, the industrial machine 12 can comprise any of a variety of welding machines including those that can be capable of stick welding, TIG welding, pulsed TIG welding, MIG welding, pulsed MIG welding, and flux-cored welding, for example. In another embodiment, the industrial machine 12 can include a plasma cutting machine.

Figure 2:
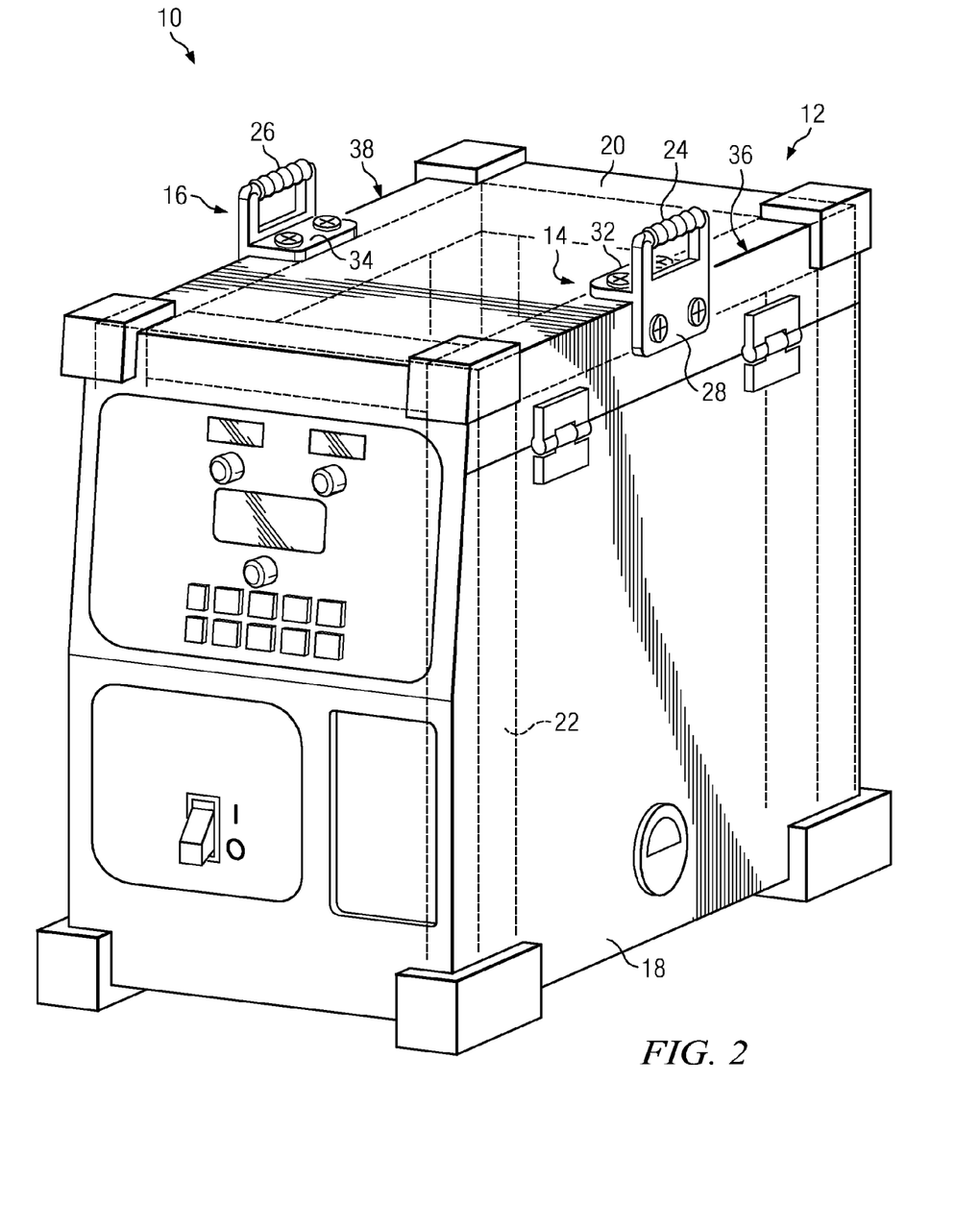
FIG. 2 is a front perspective view depicting the industrial machine assembly of FIG. 1, but with the left and right handles each shown in a second position.
Figure 3:
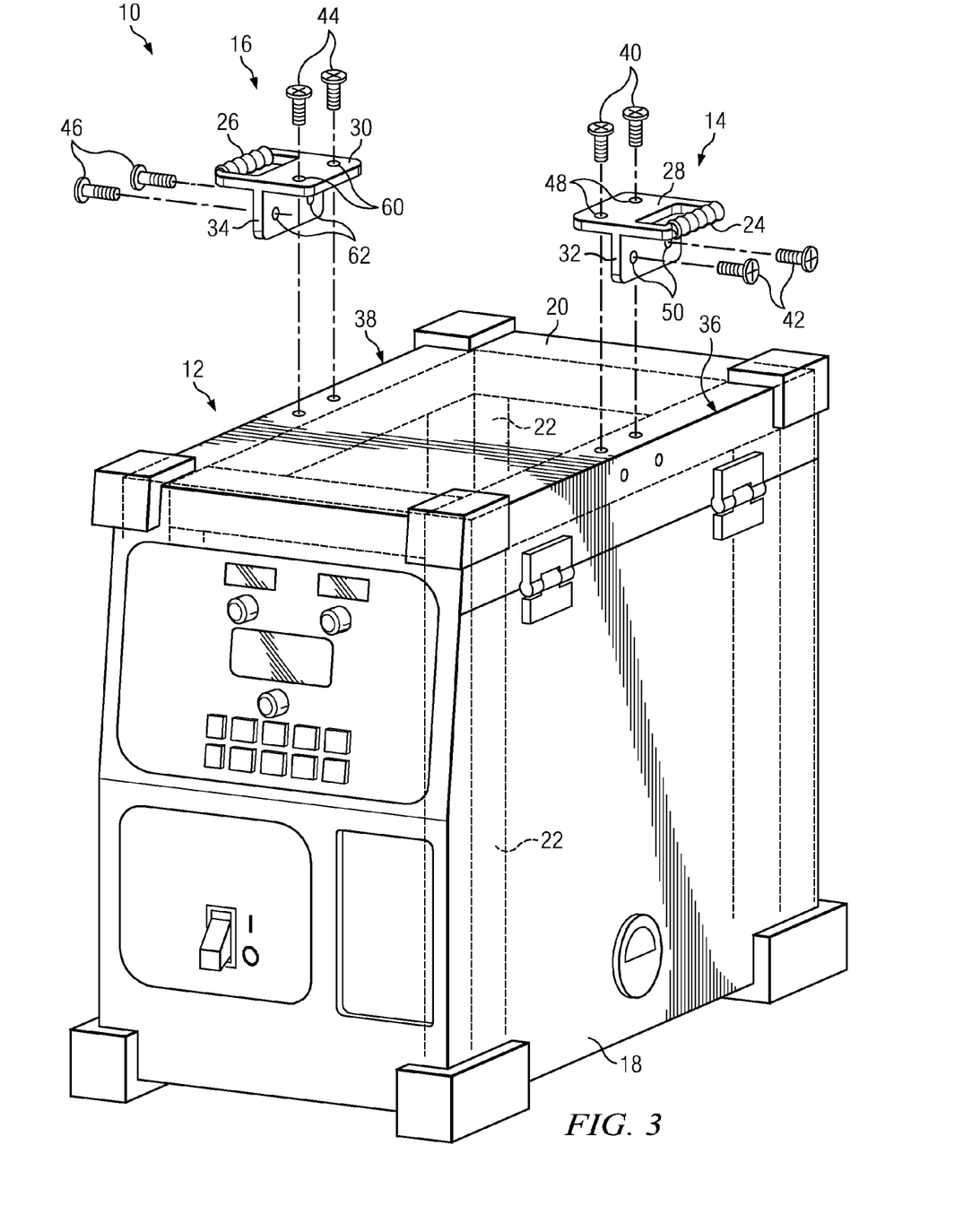
FIG. 3 is a front perspective view depicting the industrial machine assembly of FIG. 1, but with the left and right handles detached from the industrial machine.

The industrial machine 12 can include four side walls and an upper wall. For example, as shown in FIGS. 1-3, the industrial machine 12 can include a left side wall 18, a right side wall (not shown), a front side wall 19, a rear side wall (not shown), and an upper wall 20. The left side wall 18, the right side wall, the front side wall 19, the rear side wall, and the upper wall 20 can be supported by a frame 22. The left side wall 18, the right side wall, and the upper wall 20 can be selectively coupled with the frame 22 such as through the use of fasteners, for example. Alternatively, the frame 22 can be integrally formed with the left side wall 18, the right side wall, the front side wall 19, the rear side wall, and the upper wall 20 such that the left side wall 18, the right side wall, the front side wall 19, the rear side wall, the upper wall 20 and the frame 22 form a unitary, one-piece structure. Although the frame 22 is shown to comprise tubular frame members, it will be appreciated that a frame can be formed from any of a variety of suitable alternative frame member configurations such as from L-shaped frame members (e.g., angle iron), for example. In one embodiment, the left side wall 18, the right side wall, the front side wall 19, the rear side wall, the upper wall 20, and the frame 22 can be formed from metals (e.g., aluminum), metal alloys (e.g., steel), composites (e.g., carbon-fiber), or any of a variety of suitable alternative materials.

In one embodiment, as illustrated in FIG. 1, the left handle 14 can include a left grasping portion 24, a first flange 28, and a second flange 32. The right handle 16 can include a right grasping portion 26, a first flange 30, and a second flange 34. As will be described in further detail below, a plurality of fasteners 40 (shown in FIG. 3) can facilitate releasable attachment of the left and right handles 14, 16 to the industrial machine 12. It will be appreciated that attachment of the left and right handles 14, 16 can facilitate lifting of respective left and right sides of the industrial machine 12 and/or moving the industrial machine 12.

The left side wall 18 and the upper wall 20 of the industrial machine 12 can cooperate to define a left corner 36. The right side wall and the upper wall 20 of the industrial machine 12 can cooperate to define a right corner 38. The left and right handles 14, 16 can be releasably attached to the industrial machine 12 such that the left and right handles 14, 16 straddle the respective left and right corners 36, 38 in either a first position (as illustrated in FIG. 1) or a second position (as illustrated in FIG. 2).

Figure 4:
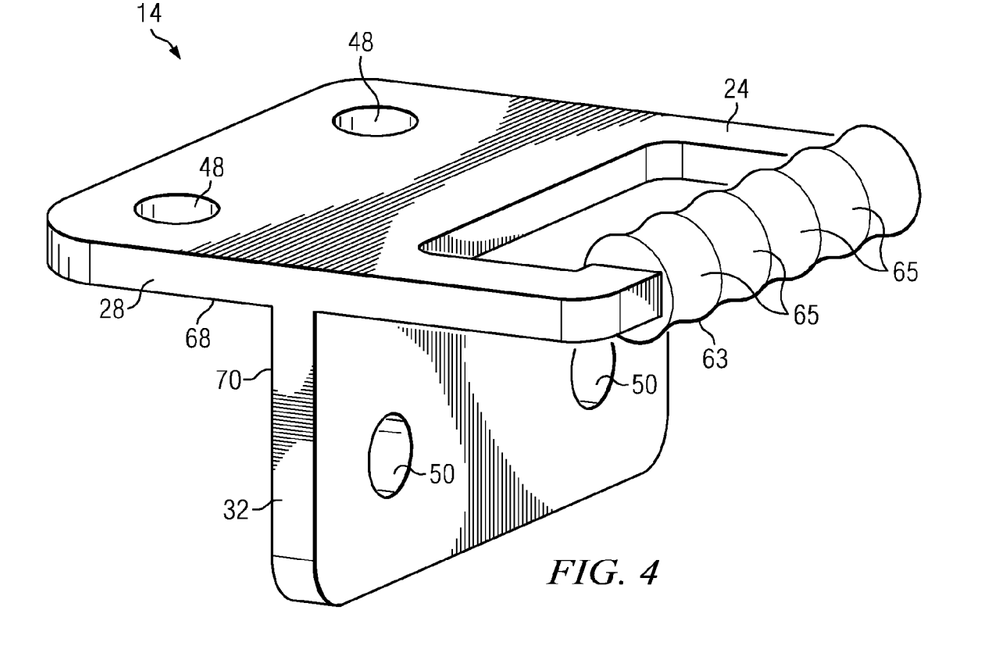
FIG. 4 is a perspective view of the left handle of FIGS. 1-3.

The left and right handles 14, 16 can accordingly be configured for attachment to the industrial machine 12 in each of the first position (as illustrated in FIG. 1) and the second position (as illustrated in FIG. 2). For example, as illustrated in FIG. 4, the first and second flanges 28, 32 of the left handle 14 can be arranged in an L-shape. The first flange 28 can define a pair of apertures 48 and the second flange 32 can define a pair of apertures 50. In alternative embodiments, a handle can have more than or less than four apertures which can be arranged in any of a variety of suitable configurations.

Figure 5:
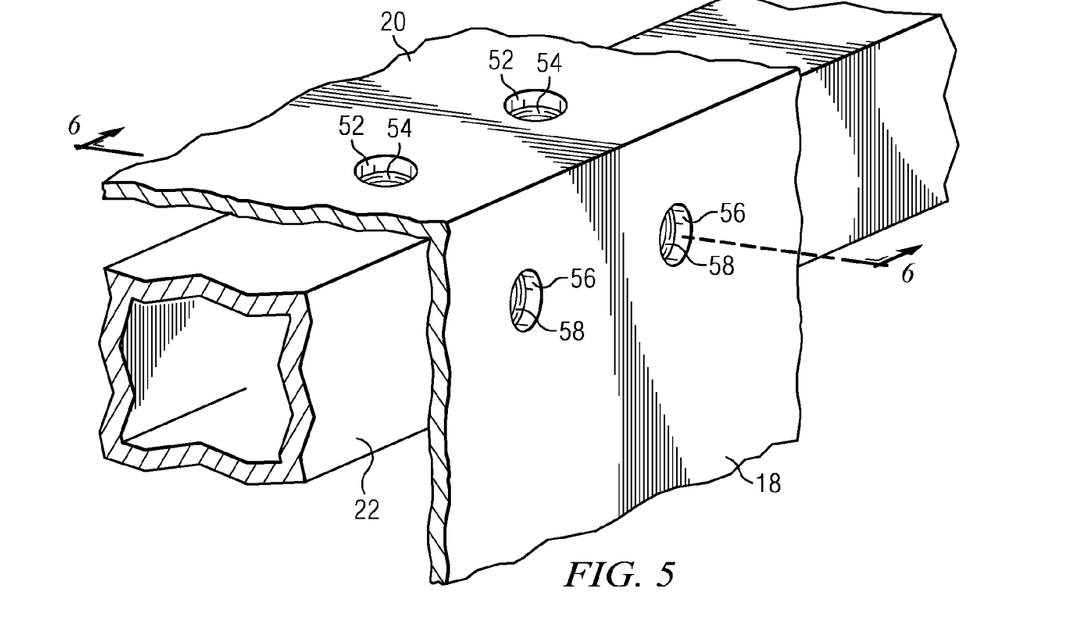
FIG. 5 is an enlarged fragmentary view of an upper wall, a left side wall, and a frame of the industrial machine assembly of FIG. 1, according to one embodiment.
Figure 6:
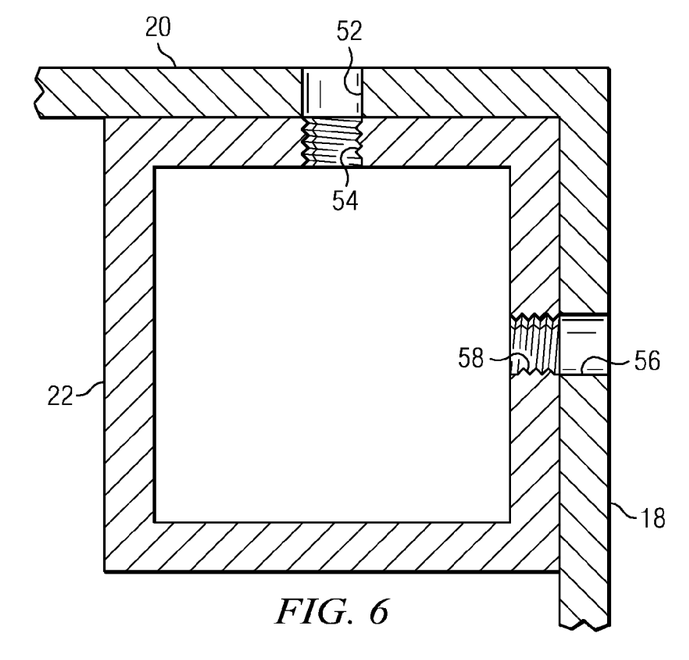
FIG. 6 is a cross-sectional view of the upper wall, the left side wall, and the frame of FIG. 5 taken along sectional line 6-6 in FIG. 5, according to one embodiment.

As illustrated in FIGS. 5 and 6, the upper wall 20 can define a pair of openings 52 and the left side wall 18 can define a pair of openings 56. The openings 52, 56 can provide access to respective threaded apertures 54, 58 that are defined by the frame 22. As illustrated in FIG. 1, when the left handle 14 is in the first position, the first flange 28 can be adjacent to the upper wall 20 and the second flange 32 can be adjacent the left side wall 18. As illustrated in FIG. 2, threaded male fasteners 40 can releasably secure the first flange 28 and the second flange 32 to the industrial machine 12. For example, as illustrated in FIG. 2, a pair of the threaded male fasteners 40 can be passed through the respective apertures 48 of the first flange 28, through the respective openings 52 in the upper wall 20, and at least partially threaded into the respective threaded apertures 54 of the frame 22. Similarly, another pair of the threaded male fasteners 40 can be passed through the respective apertures 50 of the second flange 32, through the respective openings 56 in the upper wall 20, and at least partially threaded into the respective threaded apertures 58 of the frame 22.

As illustrated in FIG. 2, when the left handle 14 is in the second position, the second flange 32 can be adjacent to the upper wall 20 and the first flange 28 can be adjacent to the left side wall 18. In such an arrangement, a pair of the threaded male fasteners 40 can be passed through the respective apertures 50 of the second flange 32, through the respective openings 52 in the upper wall 20, and at least partially into the respective threaded apertures 54 of the frame 22. Another pair of threaded male fasteners 40 can be passed through the respective apertures 48 of the first flange 28, through the respective openings 56 in the upper wall 20, and at least partially threaded into the respective threaded apertures 58 of the frame 22.

The right handle 16 can be configured similar to the left handle 14 and releasably attached to the industrial machine 12 in a similar manner as described above with respect to the left handle 14. For example, the first and second flanges 30, 34 of the right handle 16 can be arranged in an L-shape. As illustrated in FIG. 3, the first flange 30 can define a pair of apertures 60 and the second flange 32 can define a pair of apertures 62. With the right handle 16 in the first position, as illustrated in FIG. 1, the first flange 30 can be adjacent to the upper wall 20 such that a pair of fasteners 44 can be passed through the respective apertures 60 of the first flange 30, through the upper wall 20, and threaded into the frame 22. Similarly, the second flange 34 can be adjacent to the right side wall such that another pair of fasteners 46 can be passed through the respective apertures 62 of the second flange 34, through the right side wall and threaded into the frame 22.

The left and right handles 14, 16 are shown to be identical and thus interchangeable between left and right sides of the industrial machine 12. This interchangeability can allow for improved inventory and ease of assembly of the industrial machine assembly by not requiring selection of a distinct handle for left and right sides of the industrial machine 12. It will be appreciated, however, in an alternative embodiment, left and right handles can be distinct from each other such that each handle is designated for either the left or right side of the industrial machine 12.

It will be appreciated that the left and right handles 14, 16 can be positioned in one of the first and second positions to facilitate more effective and efficient lifting and/or moving of the industrial machine 12. For example, when the left and right handles 14, 16 are in the first position, as illustrated in FIG. 1, the left and right grasping portions 24, 26 can extend outwardly from the industrial machine 12 such that a shorter person can readily grasp the left and right grasping portions 24, 26 more easily when lifting the industrial machine 12. In addition, when the left and right handles 14, 16 are in the second position, as illustrated in FIG. 2, the left and right grasping portions 24, 26 can extend upwardly from the industrial machine 12, such that a taller person can readily grasp the left and right grasping portions 24, 26 without excessive bending when lifting the industrial machine 12.

As illustrated in FIG. 4, the left grasping portion 24 can include a contoured gripping surface 63. The contoured gripping surface 63 can include a plurality of protrusions 65 that are configured to extend between a user's fingers to improve comfort and facilitate more effective grasping of the left grasping portion 24. The contoured gripping surface 63 can facilitate effective grasping of the left grasping portion 24 when the left handle 14 is in either the first or second position. It will be appreciated that the right grasping portion 26 can include a contoured gripping surface that is similar in many respects to the contoured gripping surface 63 of the left grasping portion 24.

Figure 7:
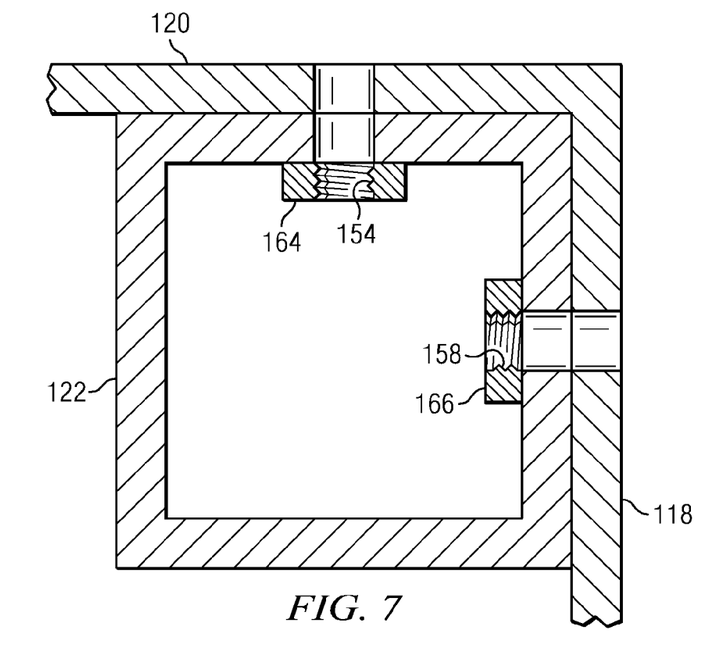
FIG. 7 is a cross-sectional view similar to FIG. 6, depicting an upper wall, a left side wall, and a frame, according to another embodiment.

The threaded apertures (e.g., 54, 58) are illustrated in FIG. 6 to be defined by the frame 22 such that the threaded male fasteners (e.g., 40) can be threaded directly into the frame 22. It will be appreciated however, that threaded male fasteners can releasably attach a handle to the industrial machine 12 in any of a variety of suitable alternative arrangements. For example, as illustrated in FIG. 7, weld nuts 164, 166 can be attached to a frame 122 and can respectively define threaded apertures 154, 158. Threaded male fasteners (e.g., 40) can pass through the either a left or an upper wall 118, 120 and through the frame 122 for threading into the respective threaded apertures 154, 158 of the weld nuts 164, 166. It will also be appreciated that any of a variety of suitable alternative means can be provided for releasably attaching left and right handles to the industrial machine 12. For example, the industrial machine 12 can include threaded male studs that are arranged along the left side wall 18, the right side wall, and the upper wall 20. The left and right handles 14, 16 can be arranged along the industrial machine 12 such that the threaded male studs can protrude through respective apertures (e.g., 48, 50, 60, 62) to facilitate releasable attachment of the left and right handles 14, 16 with nuts. In this arrangement, however, the apertures can comprise slotted apertures to facilitate more effective receipt of the threaded male studs. In another example, the left and right handles 14, 16 can include threaded male studs that can protrude into the industrial machine 12 to facilitate releasable attachment of the left and right handles 14, 16 to the industrial machine 12 with nuts.

As illustrated in FIG. 4, the first and second flanges 28, 32 of the left handle 14 can define respective first and second surfaces 68, 70. With the left handle 14 in the first position, as illustrated in FIG. 1, the first and second surfaces 68, 70 can directly contact the upper wall 20 and the left side wall 18, respectively. With the left handle 14 in the second position, as illustrated in FIG. 2, the first and second surfaces 68, 70 can directly contact the left side wall 18 and the upper wall 20, respectively. It will be appreciated however, that in some embodiments, the first and second surfaces 68, 70 of the left handle 14 might not directly contact the left and upper walls 18, 20 when the left handle 14 is attached to the industrial machine 12. For example, an elastomeric material, such as a rubber sheet, can be provided between the left handle 14 and the industrial machine 12 to prevent adherence of the left handle 14 to the industrial machine 12 and/or to reduce inadvertent removal of a coating of the industrial machine 12 due to repeated detachment and attachment of the left handle 14 to the industrial machine 12. It will be appreciated that the right handle 16 can include first and second surfaces that can interact with the industrial machine 12 in a similar manner as described with respect to the left handle 14.

Figure 8:
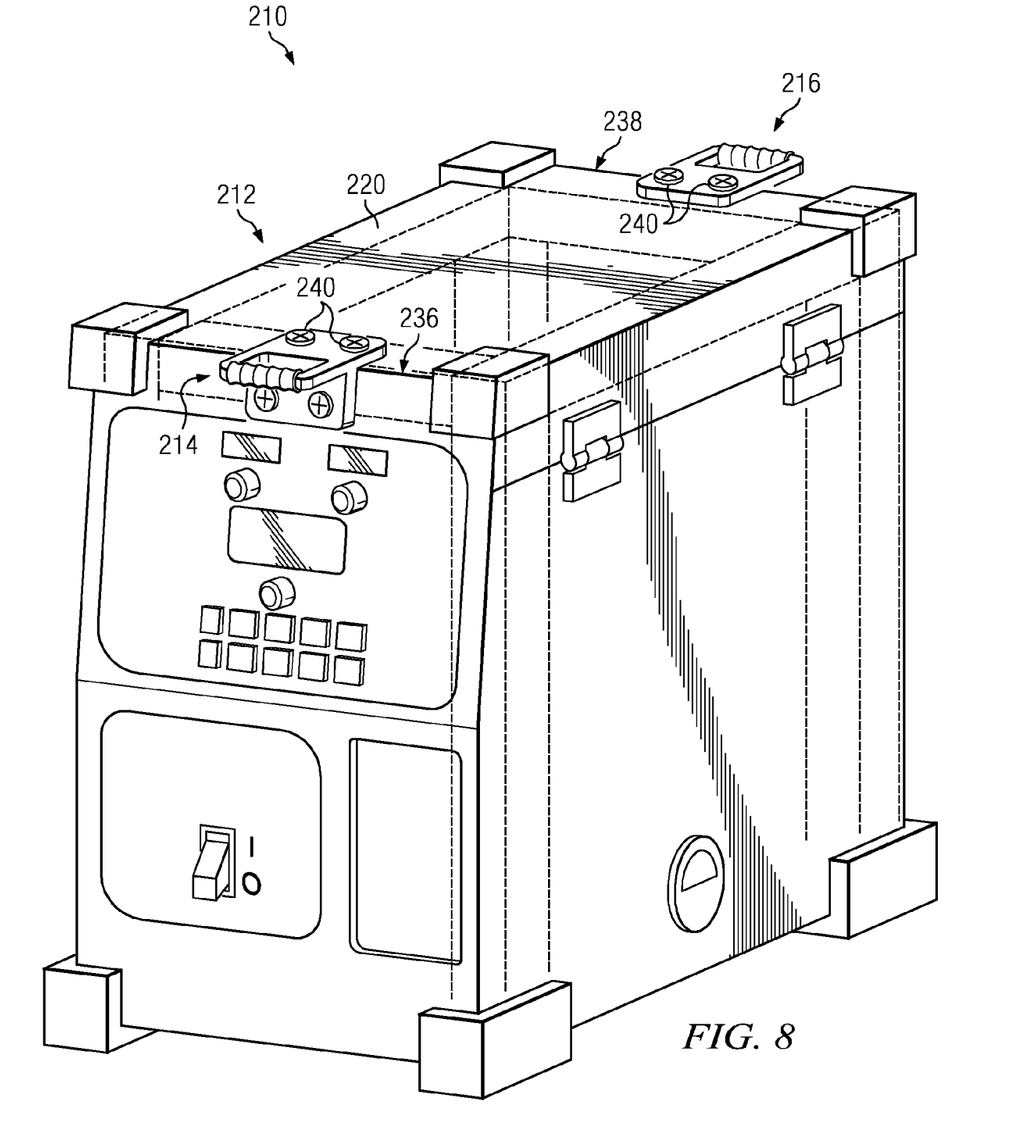
FIG. 8 is a front perspective view depicting the industrial machine assembly of FIG. 1, but including a front handle and a rear handle.

Although the embodiments above have been described with respect to a left and right handle, it will be appreciated that handles can be provided on an industrial machine in any of a variety of arrangements. For example, as illustrated in FIG. 8, an industrial machine assembly 210 can include a front handle 214 and a rear handle 216 which can be releasably attached to an industrial machine 212 such that the front and rear handles 214, 216 straddle front and rear corners 236, 238 of the industrial machine 212. The front and rear handles 214, 216 can be configured and releasably attached in a similar manner as described above with respect to right and left handles 14, 16 (e.g., with threaded male fasteners 240).

It will be appreciated that in other embodiments, the industrial machine assembly 10 can include more than or less than one pair of handles. It will also be appreciated that, although the left and right handles 14, 16 are shown to be in the same relative position, it will be appreciated that handles on an industrial machine can be attached in differing positions (e.g., the left handle 14 in the first position and the right handle 16 in the second position). While various embodiments of an industrial machine assembly have been illustrated by the foregoing description and have been described in detail with respect to FIGS. 1-8, it is not intended to be exhaustive or to limit the scope of the appended claims to such detail. Numerous modifications are possible in light of the above teachings. Some of those modifications have been discussed and others will be understood by those skilled in the art.

What is claimed is:

1. An industrial machine assembly comprising:
    an industrial machine comprising:
        a frame;
        an upper wall coupled with the frame; and
        a side wall coupled with the frame, the side wall and upper wall cooperating to define a corner; and
    a handle comprising a grasping portion, a first flange, and a second flange, the handle being releasably attached to the industrial machine and configured for attachment to the industrial machine in one of a first position and a second position;
    wherein, when the handle is in the first position, the first and second flanges straddle the corner such that the first flange is adjacent to the upper wall and the second flange is adjacent to the side wall, and, when the handle is in the second position, the first and second flanges straddle the corner such that the first flange is adjacent to the side wall and the second flange is adjacent to the upper wall.

2. The industrial machine assembly of claim 1 further comprising a plurality of fasteners, wherein at least one of the plurality of fasteners attaches the handle to the upper wall and at least another of the plurality of fasteners attaches the handle to the side wall.

3. The industrial machine assembly of claim 1 wherein the first and second flanges each define an aperture.

4. The industrial machine assembly of claim 3 wherein:
    each of the plurality of fasteners comprises a threaded male fastener;
    the frame defines a first threaded aperture and a second threaded aperture;
    the upper wall defines a first opening;
    the side wall defines a second opening;
    when the handle is in the first position, one of the plurality of fasteners passes through the aperture of the first flange, through the first opening, and at least partially into the first threaded aperture and another of the plurality of fasteners passes through the aperture of the second flange, through the second opening, and at least partially into the second threaded aperture; and
    when the handle is in the second position, one of the plurality of fasteners passes through the aperture of the second flange, through the first opening, and at least partially into the first threaded aperture, and another of the plurality of fasteners passes through the aperture of the first flange, through the second opening, and at least partially into the second threaded aperture.

5. The industrial machine assembly of claim 4 wherein the frame comprises a first weld nut and a second weld nut, and the first and second threaded apertures are respectively defined by the first and second weld nuts.

6. The industrial machine assembly of claim 1 wherein the first flange defines a first surface and the second flange defines a second surface, and wherein, when the handle is in the first position, the first surface directly contacts the upper wall and the second surface directly contacts the side wall, and wherein, when the handle is in the second position, the first surface directly contacts the side wall and the second surface directly contacts the upper wall.

7. The industrial machine assembly of claim 1 wherein the industrial machine comprises one of a welding machine and a plasma cutting machine.

8. An industrial machine assembly comprising:
    an industrial machine comprising:
        an upper wall; and
        a side wall, the side wall and upper wall cooperating to define a corner;
    a handle comprising a grasping portion, a first flange, and a second flange, the handle being configured for releasable attachment to the industrial machine in one of a first position or a second position; and
    a means for releasably attaching the handle to the industrial machine;
    wherein, when the handle is in the first position, the means for releasably attaching the handle to the industrial machine attaches the first flange to the upper wall and further attaches the second flange to the side wall, and, when the handle is in the second position, the means for releasably attaching the handle to the industrial machine attaches the first flange to the side wall and further attaches the second flange to the upper wall.

9. The industrial machine assembly of claim 8 wherein the means for releasably attaching the handle to the industrial machine comprises a plurality of threaded male fasteners.

10. The industrial machine assembly of claim 8 wherein when the handle is in the first position, the grasping portion extends outwardly with respect to the industrial machine, and when the handle is in the second position, the grasping portion extends upwardly with respect to the industrial machine.

11. The industrial machine assembly of claim 8 wherein the industrial machine comprises one of a welding machine and a plasma cutting machine.

12. An industrial machine assembly comprising:
    an industrial machine comprising:
        an upper wall;
        a first side wall, the first side wall and upper wall cooperating to define a first corner; and
        a second side wall, the second side wall and upper wall cooperating to define a second corner;
    a first handle comprising a first grasping portion, a first flange, and a second flange, the first handle being releasably attached to the industrial machine and configured for attachment to the industrial machine in one of a first position and a second position;
    a second handle comprising a second grasping portion, a third flange, and a fourth flange, the second handle being releasably attached to the industrial machine and configured for attachment to the industrial machine in one of a third position and a fourth position; wherein:

when the first handle is in the first position, the first and second flanges straddle the first corner such that the first flange is adjacent to the upper wall and the second flange is adjacent to the first side wall;

when the first handle is in the second position, the first and second flanges straddle the first corner such that the first flange is adjacent to the first side wall and the second flange is adjacent to the upper wall;

when the second handle is in the third position, the third and fourth flanges straddle the second corner such that the third flange is adjacent to the upper wall and the fourth flange is adjacent to the second side wall; and when the second handle is in the fourth position, the third and fourth flanges straddle the second corner such that the third flange is adjacent to the second side wall and the fourth flange is adjacent to the upper wall.

13. The industrial machine assembly of claim 12 wherein the first side wall comprises a left side wall, the first handle comprises a left handle, the second side wall comprises a right side wall, and the second handle comprises a right handle.

14. The industrial machine assembly of claim 12 further comprising a plurality of fasteners, wherein respective pairs of the fasteners releasably attach the first and second handles to the industrial machine.

15. The industrial machine assembly of claim 12 wherein said fasteners comprise threaded male fasteners.

16. The industrial machine assembly of claim 12 wherein when the first handle is in the first position, the first grasping portion extends outwardly with respect to the industrial machine, when the first handle is in the second position, the first grasping portion extends upwardly with respect to the industrial machine, when the second handle is in the third position, the second grasping portion extends outwardly with respect to the industrial machine, when the second handle is in the fourth position, the second grasping portion extends upwardly with respect to the industrial machine.

17. The industrial machine assembly of claim 12 wherein the first side wall comprises a front side wall, the first handle comprises a front handle, the second side wall comprises a rear side wall, and the second handle comprises a rear handle.

18. The industrial machine assembly of claim 12 wherein the industrial machine comprises one of a welding machine and a plasma cutting machine.

\* \* \* \* \*